Patented May 30, 1933

1,911,886

UNITED STATES PATENT OFFICE

FERDINAND DE PAPE, OF BRUSSELS, BELGIUM, ASSIGNOR TO LA SOUDURE ELECTRIQUE AUTOGENE, STÉ. AME, OF BRUSSELS, BELGIUM

PROCESS FOR THE MANUFACTURE OF FUSIBLE ELECTRODES FOR ELECTRIC ARC WELDING OF ALUMINIUM AND THE LIKE HAVING A SALINE COATING

No Drawing. Application filed October 30, 1931, Serial No. 572,234, and in France November 21, 1930.

This invention relates to the manufacture of fusible electrodes of aluminium or alloy of aluminium as used in electric arc welding and having a saline coating or covering obtained more especially by the process forming the subject-matter of U. S. patent application No. 482,916 in the name of applicant.

According to this process, applied to the preparation of saline coating compositions intended to supply the coating material of the electrodes of aluminium or of aluminium alloy, a suitable saline mixture is treated with a compound of acid character capable of forming by reaction or coagulation, a gelatinous precipitate and the acid reaction or coagulation mixture is afterwards fixed by the addition of a compound of alkaline character, effecting simultaneously a peptization which permits of obtaining a viscous saline paste, capable of adhering to and drying upon the metal forming the metal core of the welding electrode.

Although the phenomena of adsorption inherent in the colloidal media may have for effect to maintain the presence of an acid and a base, without, these latter reacting immediately upon one another so as to mutually neutralize one another, the degree of peptization or, in other words, the addition of alkali could nevertheless be regulated in such a manner (pH control) that at the time of the dessication of the coating composition upon the metal core of the electrode, the acid constituents may be, if not exactly, at least approximately neutralized by the basic constituents. It is evident that this control constituted a delicate manufacturing operation and one which is difficult to put into practice, but it was important to carry it out because at the time of the drying of the coated electrode, an excess of alkali in the coating composition is transformed—under the action of the carbon dioxide in the air—into corresponding alkaline carbonates, the presence of which in a small proportion reduces already the activity of the coating material due to an oxidizing action in the electric arc fusion process.

On the other hand a slight excess of peptization alkali may be necessary in order to obtain a sufficient viscosity of the coating. Furthermore experience has shown that coating pastes stored for a long time may lose their negative charge and, consequently, their viscosity (by slow mutual neutralization of the acid and basic constituents) and it may be desirable to repeptize them by the addition of a very small amount of alkali, which also gives rise to a corresponding prejudicial content of alkaline carbonates.

The process according to the present invention renders the manufacturing process independent of the alkalinity of the coating composition and, consequently, of the subsequent carbonation of the coated and dried electrodes, by permitting of work being done with degrees of peptization, that is to say of viscosity of a higher type according as may be desired.

According to the invention the electrode covered with the saline coating composition is treated with a solution of a compound which displaces the carbon dioxide and combines the alkali. In this manner the content of alkali of the peptization medium or corresponding alkaline carbonate formed in the desiccation of the coated electrode, may be transformed into a useful compound for the melting process in the electric arc.

In carrying out the process according to the invention use is made, preferably, of aqueous solutions of salts or acid salts (for example bi-sulphates) aqueous solutions of salts having an acid character in solution (for example, alkaline fluorides or soluble fluosilicates, such as fluosilicate of magnesium) or solutions of a salt with the addition of an acid (for example solutions of alkaline chlorides slightly acidulated with hydrochloric acid). The saline acid solutions are, preferably, highly concentrated, which diminishes the dissolution tension of the saline coating in the steeping liquid. The specific weight of the solutions is, preferably, above 1.300.

It is evident that the process according to the invention is not limited to the use of these salts, but use may be made of any suitable compound which will displace carbon dioxide and combine the alkali so as to form another salt.

The saline solutions used in the process according to the invention may be supplied with a colouring medium serving as an indication of the treatment.

What I claim is:

1. A process for making fusible electrodes for the electric arc welding of aluminium and the like, in which the electrodes are coated with a composition obtained in particular by treating a saline mixture with a compound of acid character capable of forming by reaction or coagulation a gelatinous precipitate and subsequently fixing the reaction or coagulation mixture by adding a compound of alkaline character which effects simultaneously a peptization to produce a viscous paste, and comprising further the steps of treating the coated and dried electrode containing alkaline carbonate formed from the carbon dioxide of the air, with a solution of a compound which displaces the carbon dioxide and which combines the alkali.

2. A process for making fusible electrodes for the electric arc welding of aluminium and the like, in which the electrodes are coated with a composition obtained in particular by treating a saline mixture with a compound of acid character capable of forming by reaction or coagulation a gelatinous precipitate and subsequently fixing the reaction or coagulation mixture by adding a compound of alkaline character which effects simultaneously a peptization to produce a viscous paste, and comprising further the step of treating the coated and dried electrode containing alkaline carbonate formed from the carbon dioxide of the air with an aqueous solution of an acid salt.

3. A process for making fusible electrodes for the electric arc welding of aluminium and the like, in which the electrodes are coated with a composition obtained in particular by treating a saline mixture with a compound of acid character capable of forming by reaction or coagulation a gelatinous precipitate and subsequently fixing the reaction or coagulation mixture by adding a compound of alkaline character which effects simultaneously a peptization to produce a viscous paste, and comprising further the step of treating the coated and dried electrode containing alkaline carbonate formed from the carbon dioxide of the air, with an aqueous solution of a salt having an acid character in solution.

4. A process for making fusible electrodes for the electric arc welding of aluminium and the like, in which the electrodes are coated with a composition obtained in particular by treating a saline mixture with a compound of acid character capable of forming by reaction or coagulation a gelatinous precipitate and subsequently fixing the reaction or coagulation mixture by adding a compound of alkaline character which effects simultaneously a peptization to produce a viscous paste, and comprising further the step of treating the coated and dried electrode containing alkaline carbonate formed from the carbon dioxide of the air, with a saline solution to which acid has been added.

5. A process of making welding rod flux compositions comprising treating a saline mixture with an acid, peptizing the reaction mass, drying the product, and then treating it with a solution capable of displacing carbon dioxide contained in the composition taken from the air.

6. A method of treating peptized welding flux compositions comprising subjecting the composition to the action of a solution capable of displacing carbon dioxide contained in the composition taken from the air.

7. A method of treating welding rods covered with an alkali peptized welding flux composition comprising subjecting the composition to the action of a solution capable of displacing carbon dioxide contained in the composition taken from the air.

In testimony whereof I affix my signature.

FERDINAND DE PAPE.